United States Patent [19]

Fergason

[11] 4,296,631
[45] Oct. 27, 1981

[54] LIQUID CRYSTAL COMPOSITIONS AND DEVICES

[75] Inventor: James L. Fergason, Kent, Ohio

[73] Assignee: Becton, Dickinson and Company, Rutherford, N.J.

[21] Appl. No.: 77,612

[22] Filed: Sep. 21, 1979

[51] Int. Cl.³ ............ C09K 3/34; C01K 3/00; C01K 11/16
[52] U.S. Cl. ............... 73/356; 23/230 LC; 116/216; 73/358; 252/299.67; 252/299.7; 252/408; 428/1
[58] Field of Search ............ 73/356, 358; 252/299, 252/403; 350/351, 330; 116/216; 23/230 LC; 428/1

[56] References Cited

U.S. PATENT DOCUMENTS

| | | | |
|---|---|---|---|
| 3,409,404 | 11/1968 | Fergason | 252/299 |
| 3,529,156 | 9/1970 | Fergason et al. | 252/299 |
| 3,580,864 | 5/1971 | Goldberg et al. | 252/299 |
| 3,580,865 | 5/1971 | Goldberg | 252/299 |
| 3,619,254 | 11/1971 | Davis | 252/299 |
| 3,620,889 | 11/1971 | Baltzer | 252/299 |
| 3,650,603 | 3/1972 | Heilmeier et al. | 252/299 |
| 3,652,148 | 3/1972 | Wysocki et al. | 252/299 |
| 3,679,290 | 7/1972 | Adams et al. | 252/299 |
| 3,779,751 | 12/1973 | Haas et al. | 252/299 |
| 3,876,286 | 4/1975 | Deutscher et al. | 252/299 |
| 3,920,574 | 11/1975 | Brown, Jr. et al. | 252/299 |
| 3,974,317 | 8/1976 | Sharpless | 252/299 |
| 3,975,288 | 8/1976 | Davis | 252/299 |
| 4,002,670 | 1/1977 | Steinstrasser | 252/299 |
| 4,066,567 | 1/1978 | Labes | 252/299 |
| 4,077,260 | 3/1978 | Gray et al. | 252/299 |
| 4,140,016 | 2/1979 | Fergason | 252/299 |
| 4,149,413 | 4/1979 | Gray et al. | 252/299 |
| 4,195,916 | 4/1980 | Coates et al. | 252/299 |

FOREIGN PATENT DOCUMENTS

| | | | |
|---|---|---|---|
| 2815172 | 10/1978 | Fed. Rep. of Germany | 252/299 |
| 2827471 | 1/1980 | Fed. Rep. of Germany | 252/299 |
| 675066 | 7/1979 | U.S.S.R. | 252/299.7 |

OTHER PUBLICATIONS

Gobl-Wunsch, A., et al., Z. Naturforsch, vol. 34A, pp. 594–599 (May 1979).
Klanderman, B. H., et al., J. Am. Chem. Soc., vol. 97, No. 6, pp. 1585–1586 (1975).

Primary Examiner—Teddy S. Gron
Attorney, Agent, or Firm—Kane, Dalsimer, Kane, Sullivan and Kurucz

[57] ABSTRACT

The disclosure is of a method of modifying the hysteretic behavior of liquid crystal compounds. The method is based on the discovery that there is a relationship between the hysteretic phenomena exhibited by liquid crystals and the viscosity of the composition including the liquid crystals. The disclosure is also of manufacturing methods (devices and compositions) which exploit the discovery.

32 Claims, 2 Drawing Figures

LIQUID CRYSTAL COMPOSITIONS AND DEVICES

BACKGROUND OF THE INVENTION

1. Field of the Invention

The invention relates to liquid crystal compositions, temperature indicating devices incorporating such compositions as a functional component thereof and methods of their manufacture.

2. Brief Description of the Prior Art

Liquid crystal compositions and their use in a wide variety of temperature sensing and recording devices are well known in the art; see for example the disclosures of U.S. Pat. Nos. 3,578,482; 3,594,126; 3,697,297; 3,704,625; 3,720,623; 3,941,901; and 3,974,317. Liquid crystals are compounds which lack a distinct melting point between solid and isotropic liquid states. Instead they exhibit an intermediate mesomorphic phase between the solid and the liquid state. In for example, cholesteric liquid crystals the mesomorphic phase (sometimes referred to as the "mesophase") is characterized by a highly colored form due to light scattering by the periodic structure (plane texture) of the phase. The color phenomena associated with the mesophase of the cholesteric liquid crystal is a function of its structured chirality or "twist" and is advantageously exploited in a variety of sensing and recording devices such as temperature indicators, electro-optical displays and the like; see for example U.S. Pat. Nos. 3,720,623; 3,779,751; and 4,016,094. When warmed to a temperature above its liquid transition point, the cholesteric liquid crystals pass from the mesomorphic phase through a phase transition point to an isotropic liquid form which may have a different color (or be colorless) than exhibited in the mesophase state.

The term "liquid transition point" as used throughout the specification and claims means the specific event at which a liquid crystal compound of liquid crystal composition passes from the mesomorphic phase to the form of an isotropic liquid as measured in terms of the temperature. This temperature event is also referred to occasionally by those skilled in the art as a "clearing point".

Thus, if one knows the liquid transition point for a given cholesteric liquid crystal, one can know when the associated temperature has been reached by the color change which occurs at the liquid transition point.

Subsequently, when the liquid crystals in their isotropic liquid form are cooled, they may not immediately revert to the colored state associated with the mesomorphic phase. Instead, they may exhibit a "hysteretic memory" which allows, for example, a temperature excursion to be observed for some time after it has occurred.

The prior art temperature sensing devices generally function by observation of the color displayed when the liquid crystal composition passes from the mesophase through its liquid transition point. For many compositions, the time period required for passage back to the mesophase upon cooling of the liquid is brief, hence the time period for observation of the liquid transition point or liquid state as an indicator of some physical occurrence such as a temperature range achievement is also brief. It would be advantageous for certain temperature indicating devices if the color or lack of color associated with the liquid state (light-scattering condition) of a given indicator composition could be retained for extended periods of time, to facilitate observation that the liquid transition point has been reached and exceeded. For example, if this extended period, which is termed the "hysteretic recovery time" could be lengthened or delayed, the operator-observer would have greater latitude in making observations that a certain sensed temperature range has occurred. Thus, there would be an improvement in for example, clinical thermometers employing a liquid crystal composition as a temperature sensor.

The present invention is based on the discovery that there is a relationship between the hysteretic recovery time phenomena exhibited by liquid crystals and the viscosity of the liquid crystal composition in the liquid isotropic state. This was not previously appreciated in the prior art where the prior art temperature sensing compositions only rarely approached viscosities in their liquid state as high as about 10 poise, and certainly not higher.

The compositions of the invention are particularly advantageous as temperature sensing components in the construction of liquid crystal functioning devices such as temperature sensing and recording instruments, where it is desirable to modify or prolong the hysteretic recovery character of the liquid crystal component, while retaining quick initial response times (response to a temperature event). Other advantages and uses of the invention will be discussed more fully hereinafter.

SUMMARY OF THE INVENTION

The invention comprises

A temperature indicating composition, which comprises; in homogeneous admixture (a) an optically active liquid crystal compound characterized in part by an intrinsic left-handed helical structure; and (b) a liquid crystal compound selected from those having an intrinsic right-handed helical structure, nematic liquid crystals and mixtures thereof; the proportions of (a) and (b) being such as to provide said composition with a liquid transition point within the range of from about 10° to 70° C., a twisting power such that the resulting composition will selectively scatter visible light at a temperature within said range and below said transition point, and a liquid state viscosity greater than about 20 poise.

Preferably, the compositions of the invention will be those which cease to scatter visible light when the composition is warmed above its liquid transition point.

The invention also comprises a method of increasing the hysteretic recovery time of a liquid crystal compound, which comprises; homogeneously admixing with said compound a proportion of a liquid crystal having a liquid viscosity greater than about 25 poise, said proportion being sufficient to achieve a liquid viscosity in the admixed composition of more than about 20 poise.

Also within the scope of the invention is a process for inhibiting the growth of domains in the isotropic liquid state of a liquid crystal containing composition, which comprises; adjusting the viscosity of said liquid state composition to more than about 20 poise by addition of a liquid crystal having a liquid viscosity of greater than about 25 poise.

The compositions of the invention are useful as temperature indicators and the methods and processes of the invention are usefully employed to provide improved temperature indicating devices and compositions.

The liquid viscosity values given or specified herein, unless otherwise stated, are at temperatures within about 10° C. above the liquid transition point for the specified compound or liquid crystal composition.

DETAILED DESCRIPTION OF THE PREFERRED EMBODIMENTS OF THE INVENTION

Figure 1:
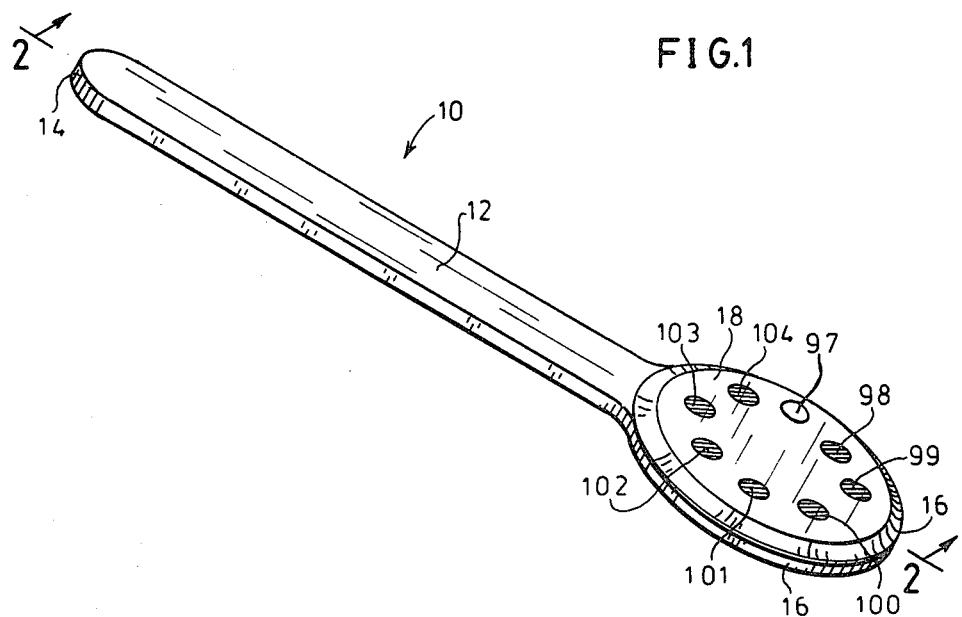
FIG. 1 is an isometric view of an embodiment temperature indicator device including compositions of the invention as the temperature sensing component.

Preferred embodiment compositions of the invention are prepared by the homogeneous admixture of at least two different liquid crystal entities. The first liquid crystal entity is an optically active liquid crystal having a left-handed helical structure. Most preferably the optically active liquid crystal will have a liquid state viscosity greater than about 25 poise. The term "left-handed helical structure" as used herein refers to the molecular arrangement of the liquid crystal compound. More specifically, it is known that the molecules in liquid crystals are arranged in very thin layers with the long axes of the molecules parallel to each other and to the plane of the layers within each layer. Because of the structural asymmetry and steric nature of the molecules the direction of the long axes of the molecules in each layer is displaced slightly from the corresponding direction in adjacent layers. This displacement is cumulative over successive layers so that overall displacement traces out a helical path.

Cholesteric liquid crystals have the property that when the propagation direction of plane polarized or unpolarized light is along the helical axis thereof, i.e., when the light enters in a direction perpendicular to the long axes of the molecules (neglecting absorption considerations) this light is essentially unaffected in transmission through thin films of such liquid crystals except for a wavelength band centered about some wavelength where $\lambda_o = 2np$ with n representing the index of refraction of the liquid crystal substance and p the pitch or repetition distance of the helical structure. The bandwidth of this wavelength band centered about $\lambda_o$ will typically be of the order of about $\lambda_o/14$. For light of a wavelength $\lambda_o$ the cholesteric liquid crystal, under these conditions, exhibits selective reflection of the light such that approximately 50% of the light is reflected and approximately 50% is transmitted, assuming negligible absorption which is usually the case, with both the reflected and transmitted beams being approximately circularly polarized in opposite directions, respectively.

For light having wavelengths around $\lambda_o$ but not at $\lambda_o$ the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean or "disturbed" texture. If $\lambda_o$ is in the visible region of the spectrum the liquid crystalline film appears to have the color corresponding to $\lambda_o$ and if $\lambda_o$ is outside the visible spectral region the film appears colorless.

Depending upon the intrinsic screw sense of the helix, i.e., whether it is right-handed or left-handed, the light that is transmitted in the region about $\lambda_o$ is either right-hand circularly polarized light (RHCPL) or left-handed circularly polarized light (LHCPL). The transmitted light is circularly polarized with the same sense as that intrinsic to the helix. Thus, a cholesteric liquid crystal having an intrinsic helical structure which is left-handed in sense will reflect LHCPL and one having a helical structure which is right-handed in sense will reflect RHCPL.

Hereinafter these cholesteric liquid crystal substances will be identified at times in order to conform with popular convention by the kind of light which is reflected at $\lambda_o$. When a compound is said to be right-handed, it is meant that it reflects RHCPL, and when a compound is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely a left-handed material is almost transparent to RHCPL at $\lambda_o$ and reflects LHCPL.

The optically active, left-handed twist compounds employed as ingredients of the compositions of the invention are those having sufficient "twisting power" or "chirality" to provide visibility to the compositions of the invention in their mesomorphic phase. The term "twisting power" or "twist" as used herein refers to the phenomenon observed when an optically active species is introduced into a nematic liquid. The nematic liquid takes a twisted configuration in all cases at low concentration and most cases at high concentrations. The pitch of the twist is inversely proportional to the molar concentration of the optically active additive (the pitch is related to the wavelength of light scattered by the index of refraction of the liquid crystal; Pitch = $n\lambda_{omax}$). Thus, $$P = \frac{T}{\text{Mole fraction of optically active compound}}$$

wherein T is the constant of proportionality and is a material parameter. The optically active liquid crystal compounds employed as ingredients in the compositions of the invention will preferably have a twist such that, $$T/n < 550\mu$$

Where n is the index of refraction of the liquid crystal composition ingredients.

Representative of optically active left-handed liquid crystals having the preferred viscosity and twist as described above are cholesteryl p-nonylphenyl carbonate, cholesteryl p-octylphenyl carbonate, cholesteryl nonylphenyl succinate, cholesteryl cinnamate, and the like, all of which are well known as is their preparation. Particularly preferred for use in the invention is cholesteryl p-nonylphenyl carbonate, which will be referred to hereinafter at times as "CNPC" for brevity.

Those skilled in the art will appreciate that cholesteryl p-nonylphenyl carbonate as prepared (see for example the method of U.S. Pat. No. 3,580,865) is in fact a heterogeneous mixture which may include at least 21 different positional and steric isomers. Accordingly, twisting power, viscosity, liquid transition point etc. may vary considerably from lot to lot of preparations and may depend to some degree on the purity and isomeric forms of the starting materials used in preparation. I prefer to use CNPC prepared from sec- or tert-p-nonylphenol as opposed to normal p-nonylphonyl so that the nonyl chain moiety in the product CNPC has a high degree of branching. The resulting mixture of CNPC isomers provides the most stable and advantageous material for use as a component of a temperature sensing composition which exhibits a useful degree of hysteretic memory. The viscosity of CNPC is in excess of 25 poise at 25° C.

The second liquid crystal entity essential to the make-up of the preferred compositions of the invention is one selected from those having an intrinsic right-handed helical structure, a nematic type and mixtures thereof. Liquid crystal compounds meeting these requirements are also well known as is the method of their preparation. Representative of right-handed liquid crystals are cholesteryl chloride, cholesteryl bromide, sitosteryl chloride, cholesteryl nonylphenoxy acetate, 4, 4'-bis(-)2-methylbutoxycarboxyphenyl aminoterephthal and the like. These compounds are well known as are methods of their preparation.

The right-handed twist liquid crystals have a plurality of functions in the compositions of the invention. One function is to aid in the control of the clearing point of the left-handed compound in those instances where the left-handed compound has a very high twisting power. The high viscosity left-handed, optically active liquid crystals such as CNPC generally have very low clearing points and alone may not be useful for a temperature sensing purpose. However, in admixture with the right-handed liquid crystal, the liquid transition point is raised in the mixed material or final composition to useful temperature ranges, for example to a point within the range of from about 10° to 70° C.

A second function of the right-handed liquid crystals in the compositions of the invention is to neutralize or nullify to some degree the twisting power of the left-handed liquid crystal ingredient.

It will be appreciated that by mixing combinations of right-handed and left-handed liquid crystal compounds, in various proportions, one can nullify one or the other to achieve ranges of twist pitches. In this way, compositions of the invention can be compounded to selectively scatter visible light at some point or points within the temperature range of from about 10° to about 70° C.

Advantageously the right and left-handed liquid crystal compounds selected as ingredients of a particular composition of the invention are those having a liquid transition point near the event temperature to be indicated, i.e.; within about 25°–35° C., preferably 20°–25° C. of the desired event temperature indication.

Nematic type liquid crystals are also a well-known class of compounds as are methods for their preparation. Preferred nematic type liquid crystals for use as ingredients of the compositions of the invention are alcohol esters and nematic forming ester derivatives. Particularly advantageous for use as ingredients of the compositions of my invention are nematic liquid crystals as illustrated by the 4-alkylphenyl-4-alkoxybenzoates such as 4-n-pentylphenyl-4-n-methoxybenzoate, 4-n-pentylphenyl-4-n-pentyloxybenzoate and the like; the 4-alkylphenyl-4-alkylbenzoates such as 4-n-pentylphenyl-4-n hexylbenzoate, 4-n-pentylphenyl-4-heptylbenzoate and the like; the 4-alkoxyphenyl-4-alkylbenzoates such as 4-n-butoxyphenyl-4-n-hexylbenzoate, 4-n-butoxyphenyl-4-n-heptylbenzoate and the like; the 4-alkoxyphenyl-4-alkoxybenzoates such as 4-n-butoxyphenyl-4-pentyloxybenzoates, 4-n-pentyloxyphenyl-4-n-methoxybenzoate and the like. The nematic liquid crystals lack twist and one of their functions in the invention is to nullify to some degree the twist of other components they are admixed with.

The compositions of the invention may be prepared by simple admixture of the above described ingredients, employing conventional mixing apparatus and technique, see for example the procedure described in the U.S. Pat. No. 3,650,603. In general, the procedure comprises placing the desired proportions of fairly pure ingredient compounds in an appropriate vessel and heating them while stirring until a uniform isotropic liquid solution is obtained. The isotropic liquid is then allowed to cool slowly to room temperature or lower as desired. During cooling, the mixture enters the mesomorphic state. Thorough stirring while the ingredients are in the isotropic liquid solution form is advantageous for obtaining homogenity of mixture. The homogenity of the mixture is advantageous for uniformity of function as a temperature sensor.

The proportion of optically active left-handed compound to the right-handed helical structure type of liquid crystals employed in the preparation of the compositions of the invention is important. In general, sufficient optically active compound of left-handed twist is provided to impart color to the compositions of the invention in their mesomorphic phase and to provide the preferred final viscosity of more than about 20 poise. The optimal proportions will depend on the degree of twist and viscosity found in the component compounds. The optimal proportion may be found by trial and error technique as those skilled in the art will appreciate. More specifically, the proportion of optically active compound should be such as to provide a concentration thereof whereby pitch, as determined by twist, divided by the index of refraction multiplied by the mole fraction of optically active ingredient is between $680\mu$ and $480\mu$, preferably $600\mu$ to $440\mu$. In general, the proportion of an optically active cholesteric liquid crystal compound will lie within the range of from about 40.0 to about 99.0 percent by weight of the total composition, perferably 41.0 to 55.0 percent.

Although the use of a single optically active, left-handed liquid crystal compound gives the desired results in the preferred compositions of the invention, mixtures of such compounds, for example mixtures of the above described optically active cholesteric liquid crystals with other optically active liquid crystals may be used as the optically active ingredient provided the mixture provides the desired twisting power and liquid viscosity.

The proportion of right-handed compound employed in the compositions of the invention is advantageously within the range of from about 1.0 to 35.0 percent by weight of the total composition.

The preferred compositions of the invention may contain, in addition to the essential left and right-handed liquid crystals, other, inert ingredients. The term "inert ingredients" as used herein means a compound or compounds which are compatible with the liquid crystals and in the proportions used will not adversely affect their desired function. Representative of such inert ingredients are dyes, stabilizers, liquid transition point elevators or depressants and the like. For example, compositions of the invention may be prepared having varied transition points by adding them to nematic type liquid crystals. The technique is well known; see U.S. Pat. No. 4,140,016.

In the most preferred compositions of the invention, mixtures of different nematic type liquid crystals may be employed as a nematic type liquid crystal additive ingredient. The blend of different nematic type liquid crystals provides a liquid crystal composition with a liquid transition point intermediate to that obtained when the ingredient nematic liquid crystals are used alone. The proportions of the nematic liquid crystals blended together may be varied so as to obtain a number of liquid crystal compositions with a range of liquid transition points. In this manner, it is possible to obtain a plurality of liquid crystalline compositions differing in composition by the proportion of nematic liquid crystal ingredients. This provides a plurality of indicating compositions which are uniform in structure and behavior. In addition, since the liquid transition point for each composition prepared is in direct proportion to the molar ratio of nematic type liquid crystal ingredients, one can prepare a series of compositions with a linear range of liquid transition points. In fact, having determined the end points of the desired range of liquid transition points, one can prepare the compositions of the invention which will provide the intermediate liquid transition points by a simple calculation of the molar ratios of the ingredient nematic type liquid crystals. This is a valuable manufacturing advantage.

The optically active, left-handed crystal compound interacts with nematic type liquid crystal ingredients of the compositions of the invention. The optically active ingredient causes the nematic liquid crystals to "twist" to a degree that light is reflected by the liquid crystal composition of the invention in the visible region of the spectra. This is of course a contribution to the desired character of the compositions of the invention.

As described above, the preferred compositions of the invention include blends of at least two nematic type liquid crystal compounds. It will be appreciated that the proportion of nematic type liquid crystals will not be such as to obviate the desired viscosity of the liquid state compositions employed in the invention. Generally the proportion of nematic liquid crystals will be within the range of from 5 to 25% by weight of the final composition. It may be advantageous if the individual nematic liquid crystals selected for admixture have liquid transition points close to each other i.e.; within about 20 degrees centigrade, of one another. However, this is not essential. It is also advantageous if the nematic type crystals are selected for combination with structurally similar nematic type liquid crystals. The close or similar structures of the combined nematic liquid crystals assure uniformity of color observed in the compositions of the invention. This is an advantage for reading the temperature indicators in which the compositions of the invention function as temperature sensing indicators. Representative of preferred combinations of nematic liquid crystals which may be advantageously employed in the compositions of the invention are those listed below in Table 1 together with their individual liquid transition points.

TABLE 1

| Nematic Crystal Mixtures | Liquid Transition Point (°C.) |
|---|---|
| 4-n-pentylphenyl-4-n-pentyloxybenzoate and | 55° |
| 4-n-pentylphenyl-4-n-methoxybenzoate | 42° |

TABLE 1-continued

| Nematic Crystal Mixtures | Liquid Transition Point (°C.) |
|---|---|
| or | |
| 4-n-pentylphenyl-4-n-methoxybenzoate and | 42° |
| 4-n-butylphenyl-4-n-heptylbenzoate or | 15° |
| 4-n-hexyloxyphenyl-4-n-butylbenzoate and | 50° |
| 4-n-heptyloxyphenyl-4-n-butylbenzoate | 43° |
| 4-n-ethoxybenzyl-4-n-butylaniline and | 75.6° |
| 4-n-butyloxybenzyl-4-n-butylaniline | 72.1° |

As stated previously, by the blending of different molar proportions of the different nematic type liquid crystals, one can obtain a plurality of nematic liquid crystal compositions having a range of liquid transition points intermediate to the liquid transition points of the ingredient nematic type liquid crystals. The range is linear and in direct relationship to the molar proportions of component liquid crystals. Addition of the nematic type liquid crystals to the optically active liquid crystal and the right handed liquid crystal will generally depress somewhat the liquid transition point observed for the mixtures of nematic type liquid crystals. However, this does not destroy the linear relationship described above. Further, when the optically active compound is a cholesteric liquid crystal the sharpness of the liquid transition points in the compositions of the invention is not eroded if the liquid transition point for the cholesteric liquid crystal is selected so as to be within about 20 degrees centigrade to that of the mixture of nematic type liquid crystals. Thus, one can select proportions of the ingredients of the compositions of the invention so as to obtain predictable liquid transition points along a linear scale. This is a manufacturing advantage in the manufacture of liquid crystal temperature indicators, enabling one to select desired temperature end points and then predict compositional mixtures which will give intermediate liquid transition points between the end points.

The compositions of the invention as described above are useful temperature indicators, characterized by their extended hysteretic recovery times and illustrate products obtained by the method of the invention. The method of the invention may be employed to extend the hysteretic recovery time of any known liquid crystal compound or composition and is not limited to manufacture of the above-described new compositions of the invention. The liquid crystals and compositions containing such liquid crystals which may be treated according to the method of the invention include but are not limited to cholesteric and nematic types of liquid crystals. As described above, the method is carried out merely by adjusting the viscosity of the liquid crystal compound or composition in its liquid state to more than about 20 poise. This may be conveniently carried out by the addition of a liquid crystal, preferably an optically active liquid crystal, having a viscosity in the liquid state of more than 25 poise, to the liquid crystal compound or composition having an undesirably brief hysteretic recovery time.

Liquid crystal compositions employed for temperature sensing and temperature observation desirably exhibit a sharp liquid transition point and delayed recovery of color upon cooling. In prior art liquid crystals, the recovery or transition from isotropic liquid to the mesomorphic phase may not be observably definite or distinct. This may be due, in part, to the growth of domains in the isotropic form of the liquid crystal. The phonemena is well known; see for example Williams, Domains in Liquid Crystals, the Journal of Chemical Physics, Vol. 39, No. 2, page 384 (July 15, 1963). These domains are well defined optical regions which are visually observable and serve to scatter visible light (yielding color). The compositions of the invention and liquid crystal compositions treated by the method of the invention to have a viscosity of greater than 20 poise do not possess visible domains in the isotropic state.

Although we do not wish to be bound by any theory of operation, the observed behavior described above may be explained very simply. When a liquid crystal passes through its clearing point, it does so on a molecular level. Thus the phase change and loss of periodic structure is complete and thorough across the entire liquid crystal specimen. When the phase change occurs in the reverse direction, the change occurs at a fixed temperature, however the domains in the liquid crystal are randomly oriented throughout the changing material. In order to scatter light, these domains must agglomerate and become single domains over a region relatively large in comparison to a wave length of light. The rate of agglomeration or domain growth is limited by the rate at which the discontinuities between domains can move in the liquid phase. This latter rate is limited and determined by the viscosity of the liquid phase. Thus adjusting the viscosity of the liquid crystal in its isotropic phase to more than about 20 poise will inhibit the growth of domains in the cooling liquid crystal and results in sharper transition points between phases. This aids observation of the transition event.

The following examples describe the manner and process of making and using the invention and set forth the best mode contemplated by the inventor of carrying out the invention but are not to be construed as limiting. Viscosity measurements were made on The Mechanical Spectrometer, Rheometrics, Inc., employing the cone and plate mode.

Hysteretic recovery times were measured by heating the liquid crystal compositions above their liquid transition points and then allowing them to cool to room temperature (circa 25° C.). Timing begins when the compositions are cooled to their liquid transition point temperature and ends when coloration is visibly observed. This is the hysteretic recovery time period.

EXAMPLE 1

An appropriate mixing vessel is charged with 25 parts of cholesteryl chloride (Chol. Cl) and 30 parts of cholesteryl p-nonylphenyl carbonate (CNPC). The mixture is heated to 100° C. and there is then added with stirring a mixture of 22 parts pentylphenyl-n-heptylbenzoate (PPHepB) and 23 parts p-n-pentylphenyl-p-methoxybenzoate (PPMeOB) previously heated to a temperature of 100° C. with continued heating a homogeneous mixture is made. The mixture is then allowed to cool to room temperature. The liquid transition point and the hysteretic recovery time for the product mixture is given in Table 2, below, under the identification number 2-6-1.

Similarly, repeating the above described general procedure a plurality of times, but varying the proportions of cholesteryl chloride, cholesteryl p-nonylphenyl carbonate (CNPC), p-n-pentylphenyl-p-n-heptylbenzoate (PPHepB) and p-n-pentylphenyl-p-methoxybenzoate (PPMeOB) or replacing one or both of PPHepB and PPMeOB with p-n-pentylphenyl p-n-pentyloxybenzoate (PPPOB), a variety of compositions having different clearing points are obtained. The hysteretic recovery times for these compositions and their liquid viscosities are also given in Table 2, below.

Upon heating the compositional mixtures to their liquid transition points, the color disappears (cessation of light scattering) as an indication that the indicated temperature has been reached. The compositions exhibit hysteresis.

TABLE 2

| No. | COMPOSITION | CLEARING POINT °C. | HYSTERETIC RECOVERY TIME (MIN) | MESOPHASE COLOR | VISCOSITY (POISE) AT 2.5 (SEC) $^{-1}$ SHEAR RATE |
|---|---|---|---|---|---|
| 2-6-1 (Control) | 25% Chol. CL 30% CNPC 22% PPHepB 23% PPMeOB | 37.0 | 1 | Blue | 4.8 |
| 2-6-2 (Control) | 32% Chol. Cl 30% CNPC 15% PPHepH 23% PPMeOB | 39.5 | 1 | Blue | 7.19 |
| 2-22-2 (Control) | 37% Chol. Cl 30% CNPC 33% PPMeOB | 35.6 | 1 | Green | 11.99 |
| 2-22-1 | 40% Chol. Cl 35% CNPC 25% PPMeOB | 35.6 | 1.5 | Green | 23.98 |
| 2-22-3 | 30% Chol. Cl 40% CNPC 30% PPMeOB | 34.0 | 2.1 | Blue | 23.98 |
| 3-10-4 | 40.40% Chol. Cl 39.60% CNPC 20% PPPOB | 41.0 | 2.1 | Blue | 50.36 |
| 2-22-4 | 40% Chol. Cl 40% CNPC 10%PPPOB 10% PPMeOB | 37.5 | 2.1 | Blue | 59.95 |
| 3-1-1 | 40% Chol. Cl 45% CNPC 10% PPPOB 5% PPMeOB | 35.5 | 4.4 | Blue | — |
| 3-10-3 | 41.41% Chol. Cl | 40.2 | 2.4 | Blue | 69.55 |

TABLE 2-continued

| No. | COMPOSITION | CLEARING POINT °C. | HYSTERETIC RECOVERY TIME (MIN) | MESOPHASE COLOR | VISCOSITY (POISE) AT 2.5 (SEC)⁻¹ SHEAR RATE |
|---|---|---|---|---|---|
| 3-10-2 | 40.59% CNCP 18% PPPOB 42.42% Chol. Cl | 39.4 | 2.6 | Green | 91.13 |
| 3-10-1 | 41.58% CNPC 16% PPPOB 43.43% Chol. Cl | 38.5 | 3.3 | Green | 139.09 |
| 1-31-1 | 42.57% CNPC 14% PPPOB 35% Chol. Cl | 48.8 | 12 | Blue | 970 |
| 0-0-5 | 50% CNPC 15% PPPOB 43% Chol. Cl 57% CNPC | 30.8 | >1440 | Blue | 6,500 |

It will be observed from the Table 2 that as the proportion of CNPC is increased in the liquid crystal compositions, the hysteretic recovery time for the compositions also increases.

The extended hysteresis observed for the liquid crystal compositions is due to the increase in their viscosity, attributable to the increased proportion of CNPC.

As also shown by the above example, the liquid transition point may be controlled directly by the variation of the mole fraction of the nematic type liquid crystal ingredients. It will also be observed that a relatively large change in the mole fraction of the nematic type liquid crystal ingredients results in a relatively small shift in liquid transition point, assuring accurate results when the compositions are used as temperature sensing indicators.

EXAMPLE 2

Following the procedure of Example 1, supra., but replacing the cholesteryl chloride, as used therein with an equal proportion of sitosteryl chloride, cholesteryl bromide, cholesteryl nonyl phenoxyacetate and 4,4'-bis(−)2-methylbutyloxycarboxyphenylamino terephthal, respectively, there is obtained a plurality of compositions useful as temperature indicating compositions.

EXAMPLE 3

Following the procedure of Example 1, supra., but replacing the PPHEPB, PPPOB and PPMeOB as used therein with equal proportions of
4-n-pentylphenyl-4-methoxybenzoate and
4-n-butylphenyl-4-n-heptylbenzoate or
4-n-hexyloxyphenyl-4-n-butylbenzoate and
4-n-heptyloxyphenyl-4-n-butylbenzoate or
4-n-ethoxybenzyl-4-n-butylaniline and
4-n-butyloxybenzyl-4-n-butylaniline.
respectively, liquid compound compositions are obtained which exhibit hysteresis and which within each series form a linear array of liquid transition points.

The liquid crystal compositions of the invention and liquid crystal compositions treated by the method of the invention are particularly useful as the temperature indicating component of a medical or clinical temperature indicating and recording device. Referring now to FIG. 1., an isometric view of an embodiment temperature recorder, one may appreciate the utility of the compositions of the invention. In FIG. 1., clinical temperature recorder 10 comprises a base or support member 12 including a handle portion 14. End 16 of the support member 12 is designed to be placed in the oral cavity of a patient whose temperature is desired. Disposed on end 16 are a plurality of indicating compositions of the invention. Each of the indicating compositions disposed on end 16 of member 12 are identified by the temperature (in degrees F.) at which the indicating composition will pass through its liquid transition point. Thus, the liquid crystal composition of the invention disposed on end 16 and identified as "97" has changed from its colored mesmorphic phase to a colorless state indicating the patient's temperature exceeds 97° F. Since the remaining compositions have not changed from their colored, mesomorphic phase, one can see that the indicator 10 was exposed to a temperature of more than 97° F. but less than 98° F. As a further illustration, the liquid crystal composition of the invention disposed on end 16 and identified as "101" will pass from its colored mesomorphic phase to the colorless isotropic liquid phase if the patient's temperature exceeds 101° F. Since the liquid crystal compositions of the invention exhibit hysteresis, i.e.,; "memory" when the recorder 10 is withdrawn from the patient's oral cavity, one may readily observe the highest temperature to which the recorder 10 was exposed by viewing the colorless liquid crystal compositions disposed thereon. Hysteresis may be controlled for any desired period up to several hours.

Support member 12 may be fabricated from any rigid, semirigid or flexible support material which is chemically and physically inert towards the indicator compositions disposed thereon. Illustratively, member 12 may be fabricated from paper which is coated with polyethylene or like protective film. Alternatively, member 12 may be fabricated from cellulose acetate, cellulose acetate butyrate, polyvinyl chloride, polyethylene, polyvinyl alcohol, polyvinylpyrrolidone and the like. Preferably support member 12 is opaque or of a dark color to absorb light and permit observation of the light scattering effect of the indicator compositions.

The indicator compositions may be coated on support member 12, using conventional techniques such as by gravure printing, silk screen printing and like methods. Advantageously the thickness of the coating of the indicator compositions of the invention on member 12 are from about 10 to about 125 microns. The compositions of the invention may be applied directly to the surface of member 12. In such case it is preferable that the coatings of indicator compositions are then protected from the atmosphere and other contaminants by a thin film overlayer 18 as shown best in FIG. 2 a view along lines 5—5 of FIG. 1. Overlayer 18 may be any transparent or translucent material immiscible with the indicator composition, for example casein glue, polyvinyl alcohol, polyethylene, methacrylate and the like.

Figure 2:
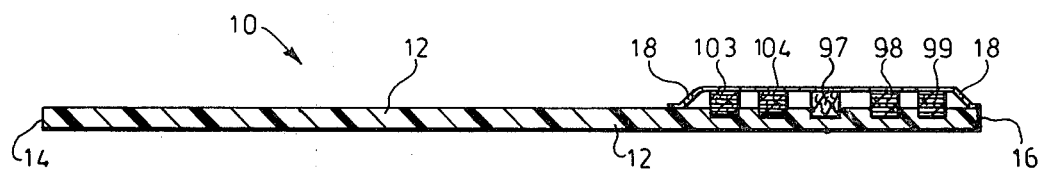
FIG. 2 is a cross-sectional side elevation view along lines 5—5 of FIG. 1.

The structural details of recorder 10 may be seen further in FIG. 2.

It is preferable that the liquid crystal compositions of the invention are first encapsulated and the encapsulated compositions affixed to support member 12 by conventional and known technique. Encapsulated material generally has a longer shelf-life, brighter colors and enhance stability. The techniques of encapsulation of liquid crystals are generally well known; see U.S. Pat. No. 2,800,457 describing closed core microencapsulation and U.S. Pat. No. 3,341,466 describing macroencapsulation.

Those skilled in the art will appreciate that many modifications of the preferred embodiments described above may be made without departing from the spirit and the scope of the invention. For example, although the preferred compositions of the invention are based on an optically active liquid crystal having an intrinsic left-handed helical structure, one could employ a right-handed optically active compound and offset the chirality of this compound employing as the second component a liquid crystal of opposite twist, i.e.; a left-handed compound.

I claim:

1. A temperature indicating composition, which comprises; in homogeneous admixture
   (a) an optically active liquid crystal compound characterized in part by an intrinsic left-handed helical structure; and
   (b) a liquid crystal compound selected from those having an intrinsic right-handed helical structure, nematic liquid crystals and mixtures thereof; the proportions of (a) and (b) being such as to provide said composition with a cholesteric-to-liquid transition point, a twisting power such that the resulting composition will selectively scatter visible light below said liquid transition point; and a liquid viscosity of from about 20 to 6500 poise at the liquid transition point temperature.

2. The composition of claim 1 wherein the optically active liquid crystal is cholesteryl p-nonylphenyl carbonate.

3. The composition of claim 1 wherein the liquid crystal (b) is cholesteryl chloride.

4. The composition of claim 1 wherein the liquid crystal compound (b) selected is a nematic type liquid crystal.

5. The composition of claim 1 wherein the concentration of the optically active compound is such that the pitch of the composition is in the range between 680μ and 440μ.

6. The composition of claim 1 wherein the optically active compound has a twist, divided by the index of refraction for the liquid crystal, of less than 550μ.

7. The composition of claim 4 wherein said nematic liquid crystal is selected from the group consisting of 4-alkylphenyl-4alkoxybenzoates, 4-alkylphenyl-4-alkylbenzoates, 4-alkoxyphenyl-4-alkylbenzoates, 4-alkoxyphenyl-4-alkoxybenzoates and mixtures thereof.

8. The composition of claim 7 wherein said nematic type liquid crystal is a mixture of at least two 4-alkylphenyl-4-alkoxybenzoates.

9. The composition of claim 7 wherein said mixture is of 4-n-pentylphenyl-4-n-heptylbenzoate and 4-n-pentylphenyl-4-n-methoxybenzoate.

10. The composition of claim 8 wherein the liquid transition points in the individual admixed nematic type liquid crystals are within about 20° C. of each other.

11. The composition of claim 10 wherein the liquid transition point of said optically active liquid crystal is within about 20° C. of the liquid transition point for said nematic type liquid crystal.

12. A method of increasing the hysteretic recovery time of a liquid crystal compound having a cholesteric-to-liquid transition point and which selectively scatters visible light below said transition point but ceases to scatter visible light above the transition point, which comprises; homogenously admixing with said compound a proportion of a liquid crystal having a liquid viscosity of about 25 to 6500 poise, said proportion being sufficient to achieve a liquid viscosity in the admixed composition of about 20 to 6500 poise at the cholesteric-to-liquid transition point of the composition.

13. The method of claim 12 wherein the liquid crystal having a liquid viscosity of about 25° to 650° poise is cholesteryl-p-nonylphenyl carbonate.

14. A process for inhibiting the growth of domains in the isotropic liquid state of a cholesteric-to-liquid crystal composition, which comprises; adjusting the viscosity of said liquid state composition to about 20 to 6500 poise while retaining the twisting power of the cholesteric liquid crystal composition to selectively scatter visible light below the cholesteric-to-liquid transition point.

15. The process of claim 14 wherein said adjusting is carried out by addition of cholesteryl p-nonylphenyl carbonate.

16. An improved temperature recording device, which comprises;
   an opaque support member;
   a cholesteric liquid crystal composition disposed on said support member, said composition comprising a mixture of
   (a) an optically active liquid crystal compound characterized in part by an intrinsic left-handed helical structure and a liquid viscosity of between about 25 poise and 6500 poise; and
   (b) a liquid crystal compound selected from those having an intrinsic right-handed helical structure, nematic liquid crystals and mixtures thereof;
   the proportions of (a) and (b) being such as to provide said composition with a cholesteric-to-liquid transition point, a twisting power such that the resulting composition will selectively scatter visible light below said liquid transition point, and will cease to scatter visible light above said cholesteric-to-liquid transition point; and a liquid viscosity of from about 20 to 6500 poise at the liquid transition point temperature.

17. The device of claim 16 wherein said support member is a dark colored material which is physically and chemically inert toward the liquid crystal compositions.

18. The device of claim 16 wherein said liquid crystal compositions are disposed on said support member by coating thereon in a thickness of from about 10 to about 125 microns.

19. The device of claim 16 wherein said liquid crystal compositions are covered with a transparent or translucent film to protect them from the atmosphere.

20. The device of claim 16 wherein said liquid crystal compositions are encapsulated.

21. The device of claim 16 wherein the optically active compound is a cholestric liquid crystal having a liquid transition point within about 25°–35° C. of the event temperature to be measured.

22. The device of claim 16 wherein the concentration of the optically active compound is such that the pitch of the composition is in the range between 680μ and 440μ.

23. The device of claim 22 wherein the range is between 600μ and 480μ.

24. The device of claim 16 wherein the optically active compound has a twist, divided by the index of refraction for the liquid crystal composition of less than 550μ.

25. The device of claim 16 wherein said optically active compound is a cholesteric liquid crystal.

26. The device of claim 25 wherein said cholesteric is cholesteryl p-nonylphenyl carbonate.

27. The device of claim 16 wherein said nematic type liquid crystals are selected from the group consisting of 4-alkylphenyl-4-alkoxybenzoates, 4-alkylphenyl-4-alkylbenzoates, 4-alkoxyphenyl-4-alkylbenzoates, 4-alkoxyphenyl-4-alkoxybenzoates and mixtures thereof.

28. The device of claim 27 wherein said nematic type liquid crystals are a mixture of at least two 4-alkylphenyl-4-alkoxybenzoates.

29. The device of claim 27 wherein said mixture is of 4-n-pentylphenyl-4-n-heptylbenzoate and 4-n-pentylphenyl-4-n-methoxybenzoate.

30. The device of claim 28 wherein the liquid transition points of the individual admixed nematic type liquid crystals are within about 20° C. of each other.

31. A temperature indicating cholesteric liquid crystal composition, which comprises; an optionally active liquid crystal composition characterized by an intrinsic helical structure such as to provide a clearing point for the composition within the range of from about 10° to about 70° C. and a twisting power whereby the composition will selectively scatter visible light at a temperature below the clearing point, said composition having a viscosity of from 20 to 6500 poise at the clearing point temperature.

32. The composition of claim 1 wherein the transition point is at a temperature within the range of from about 10° C. to about 70° C.

* * * * *

UNITED STATES PATENT AND TRADEMARK OFFICE
CERTIFICATE OF CORRECTION

PATENT NO. : 4,296,631
DATED : October 27, 1981
INVENTOR(S) : James L. Fergason

It is certified that error appears in the above—identified patent and that said Letters Patent is hereby corrected as shown below:

Col. 11, Table 2-continued, 6th heading; "AT 2.5 (SEC) 1"

should read -- AT 2.5 (SEC) -1 --

Col. 11, Table 2-continued, line 1; "40.59% CNCP" should read -- 40.59% CNPC --

Col. 14, Claim 13, line 2; "650°" should read -- 6500 --

Col. 14, Claim 14, line 2; "cholesteric-to-liquid" should read -- cholesteric liquid --

Signed and Sealed this

Sixth Day of September 1983

[SEAL]

Attest:

GERALD J. MOSSINGHOFF

Attesting Officer        Commissioner of Patents and Trademarks